June 11, 1968  C. J. HOLTKAMP  3,388,236
CONTROL FOR A SURFACE HEATER FOR COOKING APPARATUS
Filed June 24, 1965  2 Sheets-Sheet 1

WITNESSES
Theodore F. Wrobel
Benjamin B. Sklar, Jr.

INVENTOR
Calvin J. Holtkamp
BY
Robert T. French
ATTORNEY

June 11, 1968  C. J. HOLTKAMP  3,388,236
CONTROL FOR A SURFACE HEATER FOR COOKING APPARATUS
Filed June 24, 1965  2 Sheets-Sheet 2
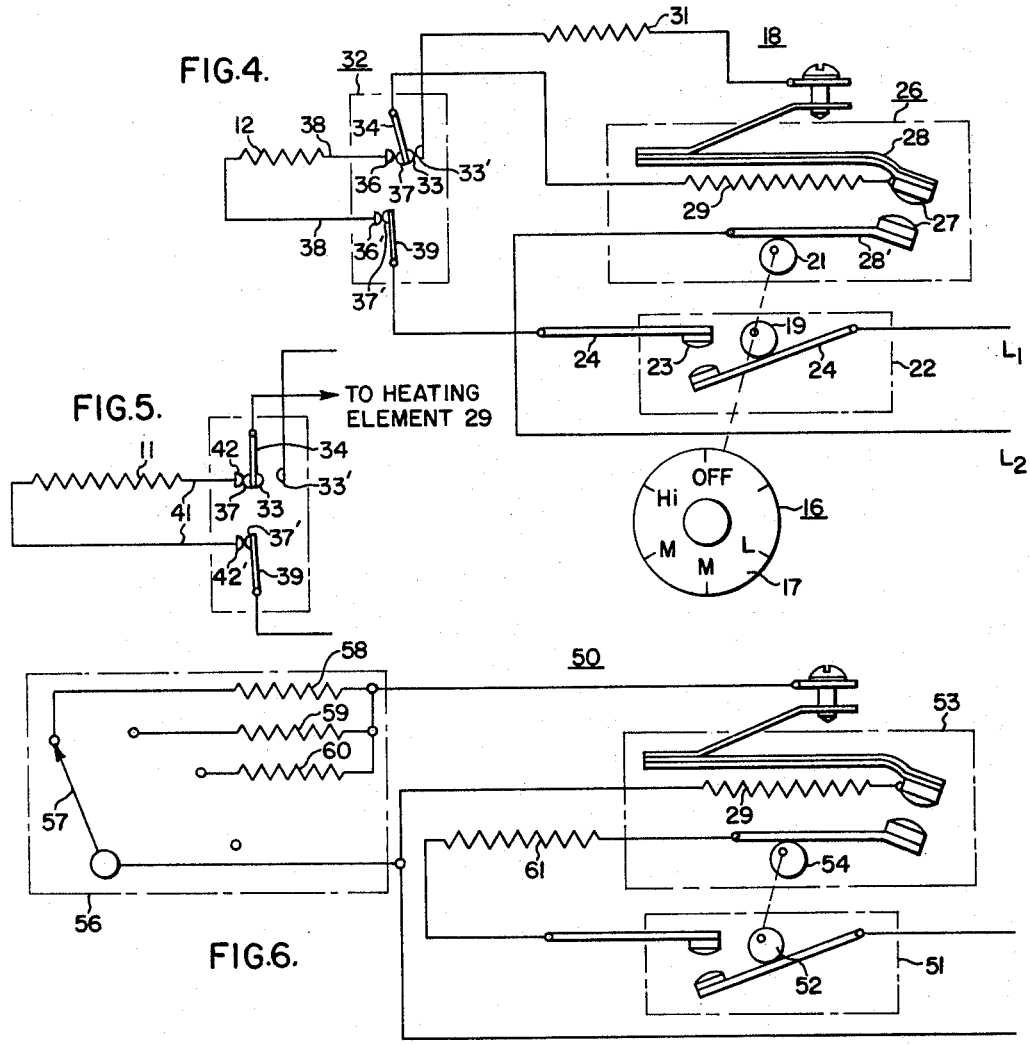
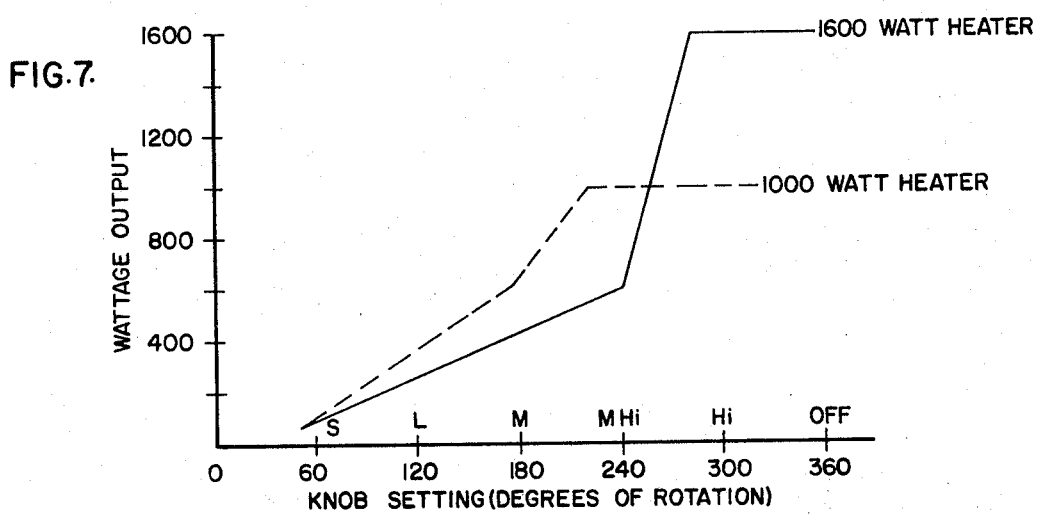

United States Patent Office 3,388,236
Patented June 11, 1968

3,388,236
CONTROL FOR A SURFACE HEATER FOR
COOKING APPARATUS
Calvin J. Holtkamp, Mansfield, Ohio, assignor to Westinghouse Electric Corporation, Pittsburgh, Pa., a corporation of Pennsylvania
Filed June 24, 1965, Ser. No. 466,783
5 Claims. (Cl. 219—485)

ABSTRACT OF THE DISCLOSURE

Switch means comprising an "infinite switch" and a switch for use with surface heater units of the type used in electric ranges. The selector switch serves to place the "infinite switch" in parallel with at least one resistance element to limit the current load on the "infinite switch" to the current value at which it was calibrated, which with certain heater elements may be less than the current required thereby.

---

This invention relates, in general, to electric ranges and, more particularly, to controls for surface heating units or the like associated therewith.

The type of range herein contemplated utilizes a conventional "infinite switch" which is a current-actuated cycling switch that maintains the wattage output of the surface heating unit of the range at a predetermined value through periodic opening and closing of the contacts of the switch, the predetermined value corresponding to the setting of a control knob by the user. The switches currently being used are rated at 4.75, 5.3, 6.78, 8.9 and 11.0 amperes depending on the wattage of the surface heating unit to be used. While it is true that this type of switching automatically compensates for normal variations in line voltage and corresponding current variations and for surface heater resistance variations during operation, the wattage output versus dial setting of a particular switch may vary beyond acceptable limits when the current through the switch deviates an appreciable amount.

Electric ranges are usually provided with four surface heating units, three of which are the same physical size and have the same wattage capacity while the fourth surface unit is larger in wattage capacity and, consequently, larger in size. It is desirable from the standpoint of the consumer and the manufacturer to be able to interchange surface units of different capacities. In other words, it would be desirable to be able to substitute a 6-inch, 1600 watt unit for a 4-inch, 1000 watt unit. However, since the "infinite switch" for the 4-inch, 1000 watt unit is calibrated to function at a lower current load than the current drawn by the 6-inch, 1600 watt unit, the wattage output of the 1000 watt unit, at a medium setting of the "infinite switch," will be approximately 175 watt higher than would be the case with the 1600 watt unit at the same control setting, thereby producing a higher temperature for the smaller of the units at this setting. Moreover, the 1000 watt unit will reach a maximum output when the switch is set for medium to medium-hot while the 1600 watt unit attains maximum output at a switch setting of hot.

Accordingly, it is the general object of this invention to provide a new and improved electric range.

It is a more particular object of this invention to provide new and improved switch means for use with surface heating units of electric ranges.

Another object of the invention is to provide new and improved control means for heating elements of electric ranges which accommodates interchangeability of heating elements of different capacities.

Briefly, the present invention accomplishes the above-cited objects by providing in the specific embodiments herein illustrated by way of example, switch means comprising an "infinite switch" and a selector switch. The selector switch is adapted to place the "infinite switch" in parallel with any one of a plurality of resistance elements which serve as bypass circuits to limit the current load on the "infinite switch" actuating member to the current value at which it was calibrated.

Further objects and advantages of the invention will become apparent as the following description proceeds and features of novelty which characterize the invention will be pointed out in particularity in the claims annexed to and forming a part of this specification.

For a better understanding of the invention reference may be had to the accompanying drawings, in which:

FIG. 4 is a schematic diagram of a control circuit and surface heating unit representing one embodiment of the invention;

FIG. 5 is a partial schematic diagram of the control circuit shown in FIG. 2, but with a modified surface heating unit;

FIG. 6 is a schematic diagram of a range heating unit and control circuitry therefor, representing a modified form of the invention; and FIG. 7 is a graph illustrating the effect of using the same "infinite switch" for different capacity heaters.

Figure 1:
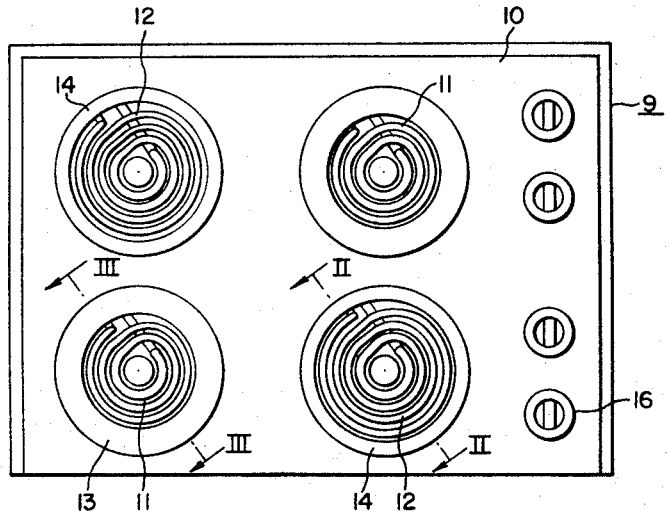
FIGURE 1 is a top plan view of an electric cooking apparatus incorporating one embodiment of the invention.
Figure 2:
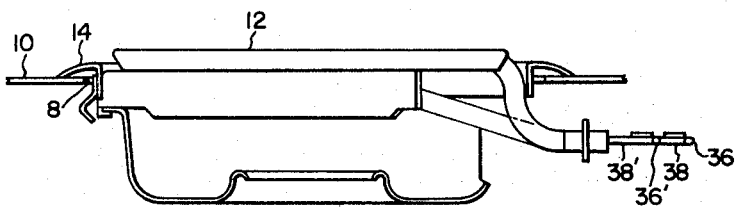
FIG. 2 is a cross-sectional view taken on the line II—II of FIG. 1.
Figure 3:
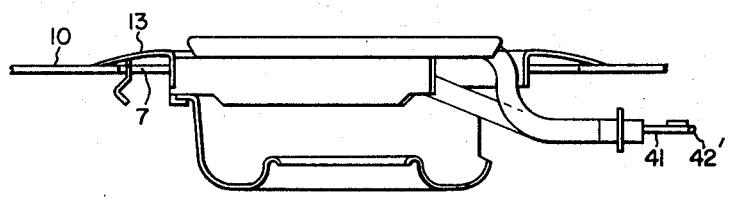
FIG. 3 is a cross-sectional view taken on the line III—III of FIG. 1.

Referring to the drawings, especially FIGS. 1-3, reference character 9 designates generally an electric apparatus having a top surface 10 supporting a plurality of plug-in surface heaters 11 of equal size and capacity and a plurality of larger plug-in surface heaters 12. A ring-shaped support member 13 may be provided for each of the surface heaters 11 for supporting the unit within equal sized openings 7 (only one shown) in the top surface 10. A ring-shaped support member 14 may be provided for supporting the larger surface heaters 12 in openings 8 (only one shown) in the top surface 10. The openings 7 and 8 are of equal diameter so that either of the surface heaters 11 and 12 may be supported therein. To this end the overall diameter of each of the heater units 11 and 12 and its corresponding support member 13 or 14 is the same. Accordingly, it will be understood that the larger heater unit 12 may be placed at the front or rear and to the left or right, the same being true of the smaller heater unit 11. A control knob 16 (see FIG. 4) having a scale 17 is provided for manually controlling the energization of the heating unit. The scale 17 comprises the indicia OFF, S, L, M, MH, and H which correspond to simmer, low, medium, medium-hot and hot, respectively.

The control knob 16 is adapted to actuate control means, generally indicated 18 (see FIG. 4) through a pair of cams 19 and 21, the cam 19 effecting closing of a main switch 22 comprising a pair of contacts 23 carried by contact arm 24.

The cam 21 serves to close an "infinite switch" 26 comprising a pair of contacts 27 carried by a pair of contact arms 28 and 28'. The contact arm 28 is a temperature responsive bimetallic element actuated by an external source of heat provided by a current carrying resistance heating element 29. To limit the current flowing through the heating element 29 a bypass resistance element 31 may be placed in parallel with the resistance heater 29 by means of a heater-actuated selector switch 32.

The selector switch 32 comprises a pair of cross wire contacts 33 and 33' the former of which is carried by a flexible spring 34. Completion of the circuit from $L_1$ to $L_2$ through the heater 12 and the resistance heating element 29 is accomplished through pairs of cross wire contacts 36, 36' and 37, 37', the contacts 36 and 36' being, respectively, carried by lead projections 38, 38' (see FIG. 3) of the heater unit 12. The contact 37 is carried by the spring 34 while the contact 37' is carried by another flexible member 39. It will be understood that the engagement of contacts 33 and 33' need not be effected by the lead extension 38. In other words, a manually actuated cam, for example, may be provided to effect engagement of these contacts in lieu of the lead 38.

The lead projection 38 is somewhat longer than lead projection 38' (see FIGS. 2 and 4) thereby serving to effect engagement of contacts 33 and 33' simultaneously with engagement of contact pairs 36, 36' and 37, 37' to establish a circuit from $L_1$ to $L_2$ through the heater 12, the resistance heating element 29 and the bypass resistance element 31, the bypass 31 being in parallel with the resistance heating element 29. The effect of establishing the last-mentioned circuit is to maintain the current load on the resistance heating element 31 substantially the same as the load at which the "infinite switch" 26 was calibrated by the manufacturer. For example, if the "infinite switch" were calibrated for use with a 4.25 ampere (1000 watt, 4-inch) heating unit and a 6.78 ampere (1600 watt, 6-inch) unit were substituted, the flow of the 6.78 ampere would be as follows: Starting at $L_1$; 6.78 amperes will flow through contacts 23, contacts 37' and 36', surface heater unit 12, contacts 36 and 37, and then to contacts 33 and 33' at which point the 6.78 amperes is divided so that 4.25 amperes flow through the resistance heating element 29 and 2.53 amperes flow through the bypass resistance element 31 and contacts 27 of the "infinite switch" 26. After these two divided currents arrive at the contacts 27, 6.78 amperes will continue toward $L_2$ via contact arm 28'.

Referring to FIG. 5 it will be seen that the plug-in surface heater 11 is provided with a pair of lead projections 41 of equal length. Since this heater will draw current equal to the calibration load current of the "infinite switch" 26 it is not necessary to have the selector switch 32 actuated for bypassing current. To this end the equal length lead projections 41 will effect completion of the circuit from $L_1$ to $L_2$ through only the surface heater 11 and the resistance heating element 29 via cross wire contacts 42 and 42' carried thereby and the contacts 37 and 37'.

Refer now to FIG. 6 wherein there is shown a modified control circuit generally indicated 50, which comprises a main switch 51 operable by means of a cam 52, an "infinite switch" 53 operable by means of a cam 54 and a bypass circuit 56. The "infinite switch" 53 and main switch 51 are exactly the same in structure and function as the "infinite switch" 26 and main switch 22, however, as can be seen in FIG. 6 the bypass circuit 56 is quite different from its counterpart in the embodiment previously discussed. The bypass circuit 56 comprises a manual multi-position selector switch 57 adapted to connect one of a plurality of resistance elements 58, 59 and 60 in parallel with the resistance heating element 29. Since the surface heater-actuated switch 32 is replaced by the manually operated switch 57, a surface heater 61 is permanently connected in the control circuit 50. The selector switch 57 may be such that it is set by the manufacturer and made inaccessible to the user or it may be controlled by means of a control knob (not shown) as desired by the user.

It will be understood that the selector switch 57 may be replaced by a single-pole, on-off switch which either opens the bypass circuit or closes it in parallel with the resistance heating element 29. In the example illustrated, however, the selector switch 57 can be set to include any one or none of the resistance elements 58, 59 or 60 in the bypass circuit.

The graph shown in FIG. 7 serves to illustrate the difference of wattage output, for a particular setting of the knob 16, of a 1000 watt heater and a 1600 watt heater used in conjunction with an "infinite switch," without a bypass or current limiting circuit, the "infinite switch" being calibrated for a current load of 4.25 amperes for use with the 1000 watt heater. It will be noted that for a particular dial setting the 1000 watt heater has a greater output and, moreover, the maximum wattage output of the curve does not correspond with the dial setting.

While there have been shown and described what are at present considered to be the preferred embodiments of the invention, modifications thereto will readily occur to those skilled in the art. It is not desired, therefore, that the invention be limited to the specific arrangements shown and described and it is intended to cover in the appended claims all such modifications as fall within the true spirit and scope of the invention.

What is claimed is:

1. In control apparatus for a plug-in type surface heater: circuitry for connecting the surface heater to a source of electrical energy, a first switch in said circuitry adapted to maintain the wattage output of the heater substantially constant, said switch comprising relatively movable electrically conducting contact arms and first current carrying means operatively connected to one of said contact arms, second current carrying means operatively connected to said one of said contact arms to form a series arrangement, a second switch operatively connected to said second current carrying means and adapted to selectively connect said second current carrying means in parallel with said first current carrying means, said second switch being rendered operable upon installation of said plug-in type surface heater, said first switch being calibrated for a current load which is different from that drawn by said surface heater, said second current carrying means being effective to alter the current flow through said first current carrying means to substantially the calibration load.

2. Surface heating apparatus for an electrical range comprising: a plug-out surface heater having a pair of leads, a lead extension carried by each of said leads, one of said extensions being longer than the other, circuitry for connecting the surface heater to a source of electrical energy, a selector switch in said circuitry adapted to be actuated by the longer of said lead extensions, a current-actuated switch means including a current carrying member in said circuitry, said switch means being calibrated for a current load which is less than that drawn by said heater, and means in said circuit operatively connected to said selector switch for limiting the current flow through said current carrying member of said switch to substantially the calibration load current.

3. Surface heating apparatus comprising: a surface heating element, circuitry for connecting said surface heating element to a source of electrical energy, switch means in said circuitry actuated by a current carrying member, said switch means being calibrated for a current load which is less than that required by said heater, and bypass means in said circuitry for limiting the current through said current carrying member to substantially the calibration load current.

4. Structure as specified in claim 3, including a selector switch for selectively connecting said limiting means in said circuitry thereby permitting use of heaters having different capacities.

5. Structure as specified in claim 4, wherein said selector switch is heater-actuated.

References Cited

UNITED STATES PATENTS 2,913,563  11/1959  Schmall et al. _____ 219—489

FOREIGN PATENTS 172,356  8/1960  Sweden.

RICHARD M. WOOD, *Primary Examiner.*

L. H. BENDER, *Assistant Examiner.*